United States Patent [19]

Handlykken

[11] 4,443,724
[45] Apr. 17, 1984

[54] SHAFT TRANSDUCER HAVING DC OUTPUT PROPORTIONAL TO ANGULAR VELOCITY

[75] Inventor: Mathias B. Handlykken, Trondheim, Norway

[73] Assignee: The United States of America as represented by the Administrator of the National Aeronautics and Space Administration, Washington, D.C.

[21] Appl. No.: 350,475

[22] Filed: Feb. 19, 1982

[51] Int. Cl.³ .............................................. H02K 17/32
[52] U.S. Cl. ................... 310/171; 310/68 B; 310/154; 335/222
[58] Field of Search ...................... 310/27, 29, 36, 112, 310/154, 267, 68 B, 171; 324/173, 174, 208; 335/229, 222

[56] References Cited

U.S. PATENT DOCUMENTS

| | | | |
|---|---|---|---|
| 3,418,612 | 12/1968 | Beckwith | 335/222 |
| 3,529,191 | 9/1970 | Baudot | 310/178 |
| 3,546,508 | 12/1970 | Harvey | 310/219 |
| 3,610,974 | 10/1971 | Kenyon | 310/49 |
| 3,611,222 | 10/1971 | Sauvignet | 335/222 |
| 3,665,227 | 5/1972 | Busch | 310/46 |
| 3,882,366 | 5/1975 | Clunis | 318/326 |
| 3,976,965 | 8/1976 | Remus | 336/120 |
| 4,188,556 | 2/1980 | Hahn | 310/268 |
| 4,292,557 | 9/1981 | Kishi | 310/78 |

FOREIGN PATENT DOCUMENTS 2806660 8/1978 Fed. Rep. of Germany .

OTHER PUBLICATIONS

Loeb, L. B., *Fundamentals of Electricity & Magnetism*, 1931, Chapman, pp. 108–109.

*Primary Examiner*—J. D. Miller
*Assistant Examiner*—D. L. Rebsch
*Attorney, Agent, or Firm*—Paul F. McCaul; Thomas H. Jones; John R. Manning

[57] ABSTRACT

A brushless DC tachometer is disclosed that includes a high strength toroidal permanent magnet (25) for providing a uniform magnetic field in an air gap, an annular pole piece (21) opposite the magnet, and a pickup coil (19) wound around the pole piece (21) and rotating about the axis of the pole piece. The pickup coil is rotated by an input shaft (15) to which the coil (19) is coupled with a friction clip. The output of the coil (19) is conducted to circuitry (31) by a twisted wire pair (29). The input shaft (15) also activates a position transducing potentiometer (13).

16 Claims, 3 Drawing Figures

SHAFT TRANSDUCER HAVING DC OUTPUT PROPORTIONAL TO ANGULAR VELOCITY

BACKGROUND OF THE INVENTION

Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

BACKGROUND OF THE INVENTION

The subject invention relates to shaft transducers and tachometers for use in servo systems. Shaft transducers and tachometers are utilized in servo systems for providing signals indicative of position, velocity, and acceleration. Those signals are processed for feedback control.

Specifically, the disclosed invention relates to a shaft transducer that produces accurate DC signals at slow angular velocities and small angular displacements.

BRIEF DESCRIPTION OF THE PRIOR ART

Prior art DC tachometers and transducers generally are miniature versions of generators and require high speeds and continuous rotation for operation. Such a prior art tachometer is generally placed in the geartrain between the servo motor and the output shaft.

The disadvantages of such prior art DC tachometers include the required speed and displacement for operation. Further, the outputs provided represent an average velocity. Gear backlash is not taken into account and seriously affects accuracy.

Pulse generators have also been used in servo systems. For example, a pulse generator would provide a series of pulses wherein the frequency of the pulses is proportional to velocity.

The disadvantages of pulse generators include the variation in magnitude of the output pulses, and the limited number of output pulses per revolution and therefore a limited amount of velocity information. Further, at low speed speeds and small displacements, pulse generators present problems relative to resolution and precision which are difficult to overcome.

A further prior art tachometer system utilizes a homopolar (non-reversing or unipolar) and uniform magnetic field and is disclosed in U.S. Pat. No. 3,882,366 issued to Clunis on May 6, 1975. That system is a motor speed control system that includes a Faraday disk or cylinder or some other conductor that is shaped and mounted to uniformly intersect the magnetic field at all rotational positions. The Faraday element or conductor rotates with the motor shaft.

The disadvantages of the prior art Clunis system include the high rotational speeds required to provide an output of any significance. Moreover, since the conductor makes complete revolutions, brushes are utilized to pick up the output of the conductor.

It is therefore an object of this invention to provide an improved shaft transducer having a DC output signal proportional to the angular velocity of the shaft.

A further object of the invention is to provide an improved shaft transducer that is accurate at slow speeds.

Another object of the invention is to provide an improved shaft transducer that is accurate at relatively small displacements.

Still another object of the invention is to provide an improved shaft transducer that can be coupled directly to an output shaft in a servo system.

A further object of the invention is to provide an improved shaft transducer that operates over less than a complete revolution of a servo system output shaft.

Another object of the invention is to provide a shaft transducer that does not utilize brushes.

SUMMARY OF THE INVENTION

The foregoing and other objects of the invention are achieved in a shaft transducer that includes a magnetic circuit that produces a uniform magnetic field of substantially constant flux in an air gap. A movable coil is coupled to a rotatable input shaft which causes the coil to move in the uniform magnetic field. The movable coil provides an output that can be utilized by circuitry to determine velocity and acceleration.

BRIEF DESCRIPTION OF THE DRAWING

The advantages and features of the disclosed and claimed invention will be readily understood from the detailed description when read in conjunction with the drawing wherein:

DETAILED DESCRIPTION OF THE INVENTION

Figure 1:
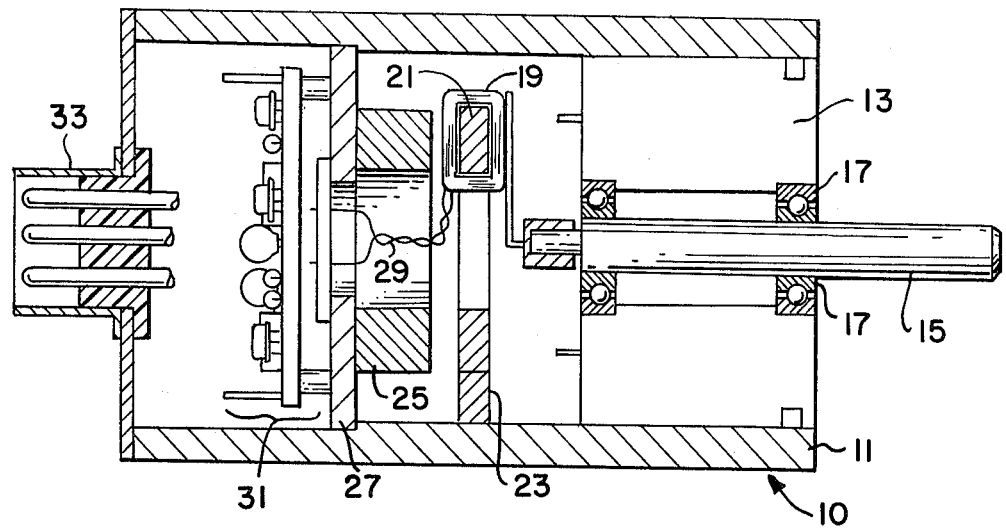
FIG. 1 is a cross section diagram of the disclosed shaft transducer.

In the following description, like elements in the different figures are referred to by like numbers as shown in the drawing.

Referring now to FIG. 1, the shaft transducer 10 includes a housing 11 which is made from a magnetically conductive material. Mounted within the housing 11 is a potentiometer 13 which is actuated by an input shaft 15. The input shaft 15 is coupled to an output shaft (not shown) of a servo system. The input shaft 15 is rotatably supported by a plurality of precision bearings 17. The potentiometer 13 provides an output that is indicative of the angular position of the input shaft 15. The use of a potentiometer 13 for providing position information is well known.

Within the housing 11, a pickup coil 19 is coupled to the input shaft 15 by a friction coupling. The friction coupling prevents damage to the pickup coil in the event rotation of the input shaft 15 goes beyond the range of movement of the pickup coil 19. The pickup coil 19 is around an annular pole piece 21 which is supported by a magnetically conductive support member 23 which is attached to the housing 11.

A high strength, rare-earth toroidal permanent magnet 25 is supported by a magnetically conductive support member 27. The permanent magnet 25 is situated opposite the annular pole piece 21 and provides a uniform magnetic field of substantially constant flux in the air gap between the magnet 25 and the pole piece 21. The pole piece 21 and the permanent magnet 25 are on a common axis.

A twisted wire pair 29 is attached to the pickup coil 19 and passes through the toroidal magnet 25 to a group of electrical components 31. The electrical components 31 include well known circuitry for processing the output of the pickup coil 19 to provide outputs indicative of velocity and acceleration of the pickup coil 19. The electrical components 31 should also include circuitry for utilizing the potentiometer 13 to provide an output indicative of the position of the input shaft 15. Such circuitry is also well known.

The electrical components 31 that form the circuitry for providing signals indicative of position, velocity, and acceleration are advantageously located in the housing 11. That preserves the accuracy of the signal produced by the pickup coil 19. The electrical components 31 are coupled to external circuitry by a multiple pin connector 33.

Figure 2:
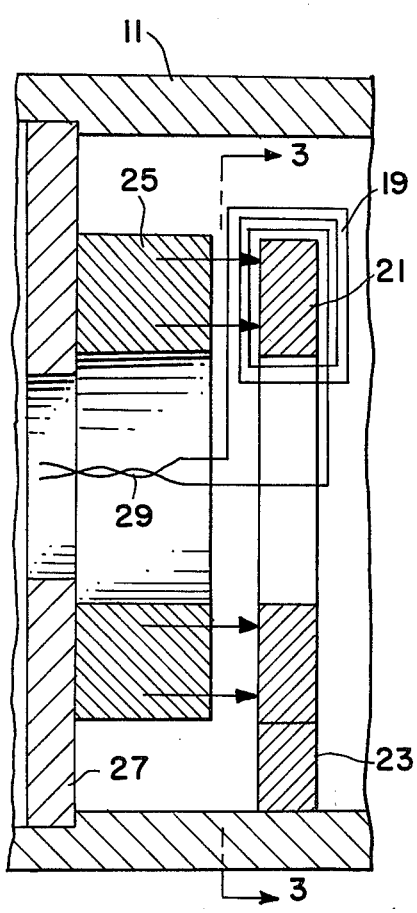
FIG. 2 is a detailed cross section diagram of the magnetic circuit in the shaft transducer of FIG. 1.

Referring now to FIG. 2, shown in detail therein is the magnetic circuit of the shaft transducer 10. Particularly, the high strength rare-earth toroidal magnet 25 provides the uniform unipolar (non-reversing) magnetic field across an air gap to the annular pole piece 21. The support members 23 and 27, and the housing 11 are magnetically conductive, and therefore complete the magnetic circuit. As shown, the pickup coil 19 is wound around the annular pole piece 21 so that the coil 19 can be angularly displaced about the pole piece 21. Coil 19 comprises a plurality of individual wire turns with the turns being generally transverse to the axis of rotation of the coil. A section of the coil is disposed within the uniform magnetic field in the air gap between magnet 25 and pole piece 21. That section of coil 19 on the opposite side of pole piece 21 is substantially outside the uniform magnetic field. Thus, the electromotive force produced by the electrical conductors which form the section of coil 19 disposed within the air gap is much larger that the opposite electromotive force produced by the electrical conductors which form the section of coil 19 which is positioned outside the gap.

Figure 3:
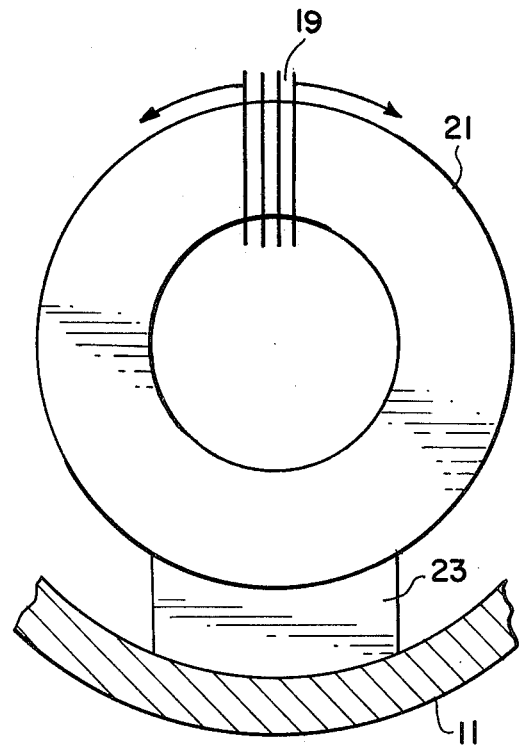
FIG. 3 illustrates the pole piece of the magnetic circuit of FIG. 2.

FIG. 3 shows the annular shape of the pole piece 21 and the location of the support member 23. The support member 23 extends only for a small portion of the outer circumference of the pole piece 21 so that the coil 19 can move through a range of about 270 degrees. The friction coupling of the pickup coil 19 to the input shaft 15 prevents damage to the coil in the event rotation of the input shaft 15 exceeds the limits imposed by the support member 23.

The pickup coil 19 is wound around the pole piece 21 on a temporary coil form by an appropriate coil winding machine. After winding, the temporary form is removed or dissolved.

Since the pickup coil 19 can travel only through less than a full revolution, the twisted wire pair 29 is advantageously utilized, thereby avoiding brushes and the distortions they introduce.

The output $E_{OUT}$ of the pickup coil 19 is proportional to the magnetic field B and the velocity V of the coil in accordance with the well-known equation:

$$E_{OUT} = -B \times V$$

Since the magnetic field is substantially uniform in the range of travel of the pickup coil 19, the output of the pickup coil 19 varies solely as a function of velocity. The pickup coil output on the twisted wire pair 29 is appropriately utilized by the electrical components 31 to provide outputs indicative of velocity and acceleration.

Although the foregoing has been a description of the preferred embodiment, persons skilled in the art will recognize that changes and modifications can be made thereto without departing from the spirit and scope of the invention which is defined by the claims.

What is claimed is:

1. A transducer for measuring the angular velocity of a rotatable member such as a shaft, said transducer comprising:
   at least one electrical conductor moveable through an arcuate path;
   coupling means for coupling said conductor to the rotatable member and for driving said electrical conductor along said arcuate path at a velocity proportional to the angular velocity of the rotatable member;
   limiting means for limiting movement of said conductor along said arcuate path to less than, but at least one-half of, a complete rotation;
   magnetic circuit means for producing a substantially uniform unipolar magnetic field along said arcuate path of said electrical conductor wherein said magnetic circuit means is composed of an annular magnet and an annular pole piece separated by an annular air gap with said annular magnet, said annular pole piece and said air gap having the same axis of revolution, and with the flux in said air gap being generally parallel to said axis of revolution; and
   output means for electrically coupling said at least one electrical conductor to an output.

2. The transducer of claim 1 wherein said at least one electrical conductor comprises a first section of a wire coil having a plurality of turns disposed within said magnetic field with a second section of said wire coil being disposed outside said field.

3. The transducer of claim 2 wherein said limiting means includes means for decoupling said coil from the rotatable member.

4. The transducer of claim 3 wherein said output means includes a twisted wire pair.

5. The transducer of claim 1 further comprising a housing with said wire coil, said magnet and said pole piece being disposed within said housing and said magnetic circuit means further comprises a magnetically conductive support means attached to said pole piece for supporting said pole piece within said housing.

6. The transducer of claim 5 wherein said housing is fabricated from a magnetically conductive material and comprises part of said magnetic circuit means.

7. The transducer of claim 6 wherein said limiting means includes said magnetically conductive support means.

8. The transducer of claim 7 wherein said limiting means further includes means for decoupling said coil from the rotatable member.

9. The transducer of claim 8 wherein said decoupling means of said limiting means comprises a friction clip.

10. The transducer of claim 9 wherein said coupling means further comprises a rotatably-mounted shaft coaxial with said annular pole piece.

11. A transducer for producing a signal indicative of the movement of a rotatable body, said transducer comprising:
    magnetic circuit means for producing a substantially uniform unipolar magnetic field along an arcuate path wherein said magnetic circuit means is composed of an annular magnet and an annular pole piece separated by an annular air gap with said annular magnet, said annular pole piece and said air gap having the same axis of revolution, and with the flux in said air gap being generally parallel to said axis of revolution;

an electrical conductor in the form of a coil moveable over said arcuate path;

mechanical coupling means for coupling said wire coil to the rotatable body and driving said coil along said arcuate path with a first section of said coil being disposed in said magnetic field and a second section of said coil being disposed outside said field; and electrical coupling means for electrically coupling said coil to an output; and whereby said signal indicative of the movement of said rotatable body is produced at said output.

12. The transducer of claim 11 further comprising limiting means for limiting movement of said coil along said arcuate path to less than a full rotation.

13. The transducer of claim 12 further comprising a housing with said magnet, pole piece and coil being disposed within said housing and said limiting means is also a means for supporting said pole piece within and spaced apart from said housing.

14. The transducer of claim 13 wherein said limiting means is fabricated from a magnetically conductive material.

15. A transducer for measuring the movement of a shaft, said transducer comprising:

an electrical conductor in the form of a coil;

coupling means for coupling said coil to the shaft and for driving said coil along an arcuate path;

magnetic circuit means for providing a substantially uniform unipolar magnetic field in said arcuate path, said magnetic circuit means comprising an annular magnet, an annular pole piece fabricated from a magnetically conductive material spaced apart from said annular magnet and having a common axis of rotation with said annular magnet so as to form an air gap between said pole piece and said annular magnet, said air gap also having said common axis of rotation, with the flux in said air gap being generally parallel to said axis of revolution, and with said coil encircling a portion of said annular pole piece and rotatable about said common axis of said pole piece, and magnetic coupling means fabricated from a magnetically conductive material for magnetically coupling said annular pole piece to said annular magnet;

limiting means for limiting rotation of said coil along said arcuate path to less than a full rotation; and output means for electrically coupling said coil to an output.

16. The transducer of claim 15 further comprising:

a magnetically conductive housing, with said magnet, pole piece and coil disposed within said housing, said housing forming part of said magnetic coupling means; and magnetically conductive support means attached to said housing for supporting said annular pole piece and for forming part of said magnetic coupling means.

* * * * *